(12) United States Patent
Evelyn-Veere

(10) Patent No.: US 7,532,954 B2
(45) Date of Patent: May 12, 2009

(54) SYSTEM AND METHOD FOR WEATHER BASED IRRIGATION CONTROL

(75) Inventor: Rene H. Evelyn-Veere, San Diego, CA (US)

(73) Assignee: Rain Bird Corporation, Azusa, CA (US)

(*) Notice: Subject to any disclaimer, the term of this patent is extended or adjusted under 35 U.S.C. 154(b) by 142 days.

(21) Appl. No.: 11/352,080

(22) Filed: Feb. 10, 2006

(65) Prior Publication Data
US 2006/0184285 A1 Aug. 17, 2006

Related U.S. Application Data

(60) Provisional application No. 60/652,117, filed on Feb. 11, 2005.

(51) Int. Cl.
*G05D 7/00* (2006.01)
(52) U.S. Cl. .......................... 700/284; 239/69
(58) Field of Classification Search ................. 700/284, 700/11; 239/69
See application file for complete search history.

(56) References Cited

U.S. PATENT DOCUMENTS

| | | | |
|---|---|---|---|
| 3,787,728 A | 1/1974 | Bayer et al. | |
| 3,902,825 A | 9/1975 | Quillen | |
| 4,014,359 A | 3/1977 | Sanner | |
| 4,015,366 A | 4/1977 | Hall, III | |
| 4,130,382 A | 12/1978 | Bode | |
| 4,176,395 A | 11/1979 | Evelyn-Veere et al. | |
| 4,545,396 A | 10/1985 | Miller et al. | |
| 4,548,225 A | 10/1985 | Busalacchi | |
| 4,755,942 A | 7/1988 | Gardner et al. | |

(Continued)

FOREIGN PATENT DOCUMENTS

GB 2097555 4/1982

(Continued)

OTHER PUBLICATIONS

Marin Municipal Water District, "Evapotranspiration: What is it and Why is it Important?", http://web.archive.org/web/20010425215336/http://www.marinwater.org/evapotranspiration.html, Apr. 25, 2001.

(Continued)

*Primary Examiner*—Albert DeCady
*Assistant Examiner*—Steven R Garland
(74) *Attorney, Agent, or Firm*—Fitch, Even, Tabin & Flannery

(57) ABSTRACT

Some embodiments provide methods, systems and computer readable mediums storing programs, instructions and/or coding for use in setting up and/or controlling irrigation. A method for use in controlling an irrigation system is provided according to some embodiments that receives a first current moisture loss value, determines a first net moisture loss value since a last irrigation start day utilizing the first current moisture loss value, retrieves a threshold moisture loss value associated with one or more watering programs controlled according to one of a plurality of selectable irrigation control levels that correspond to different ways of associating threshold moisture loss values to watering programs, and defining a current day as an irrigation start day for the one or more watering programs associated with the first irrigation control level when the first net moisture loss value has a predetermined relationship with respect to the threshold moisture loss value.

19 Claims, 12 Drawing Sheets

U.S. PATENT DOCUMENTS

| | | | |
|---|---|---|---|
| 4,856,227 A | 8/1989 | Oglevee et al. |
| 4,858,377 A | 8/1989 | Oglevee et al. |
| 4,876,647 A | 10/1989 | Gardner et al. |
| 4,921,001 A | 5/1990 | Pittsinger |
| 4,922,433 A | 5/1990 | Mark |
| 4,962,522 A | 10/1990 | Marian |
| 4,992,942 A | 2/1991 | Bauerle et al. |
| 5,021,939 A | 6/1991 | Pulgiese |
| 5,023,787 A | 6/1991 | Evelyn-Veere |
| 5,025,361 A | 6/1991 | Pitman et al. |
| 5,038,268 A | 8/1991 | Krause et al. |
| 5,097,861 A | 3/1992 | Hopkins et al. |
| 5,148,826 A | 9/1992 | Bakhshaei |
| 5,208,855 A | 5/1993 | Marian |
| 5,229,937 A | 7/1993 | Evelyn-Veere |
| 5,355,122 A | 10/1994 | Erickson |
| 5,444,611 A | 8/1995 | Woytowitz et al. |
| 5,445,176 A | 8/1995 | Goff |
| 5,479,339 A | 12/1995 | Miller |
| 5,638,847 A | 6/1997 | Hoch, Jr. et al. |
| 5,668,719 A | 9/1997 | Bobrov et al. |
| 5,696,671 A | 12/1997 | Oliver |
| 5,839,660 A | 11/1998 | Morgenstern et al. |
| 5,853,122 A | 12/1998 | Caprio |
| 5,870,302 A | 2/1999 | Oliver |
| 5,960,813 A | 10/1999 | Sturman et al. |
| 6,145,755 A | 11/2000 | Feltz |
| 6,276,298 B1 | 8/2001 | Welsh |
| 6,298,285 B1 | 10/2001 | Addink et al. |
| 6,314,340 B1 | 11/2001 | Mecham et al. |
| 6,343,255 B1 | 1/2002 | Peek et al. |
| 6,452,499 B1 | 9/2002 | Runge et al. |
| 6,453,215 B1 | 9/2002 | Lavoie |
| 6,453,216 B1 | 9/2002 | McCabe et al. |
| 6,585,168 B1 | 7/2003 | Caprio |
| 6,675,098 B2 | 1/2004 | Peek et al. |
| 6,748,327 B1 | 6/2004 | Watson |
| 6,782,311 B2 | 8/2004 | Barlow et al. |
| 6,850,819 B1 | 2/2005 | Townsend |
| 6,892,113 B1 | 5/2005 | Addink et al. |
| 6,892,114 B1 | 5/2005 | Addink et al. |
| 6,895,987 B2 | 5/2005 | Addink et al. |
| 6,947,811 B2 | 9/2005 | Addink et al. |
| 2001/0049563 A1 | 12/2001 | Addink et al. |
| 2002/0010516 A1 | 1/2002 | Addink et al. |
| 2002/0014539 A1 | 2/2002 | Pagano et al. |
| 2002/0020441 A1 | 2/2002 | Addink |
| 2002/0029111 A1 | 3/2002 | Peek et al. |
| 2002/0060631 A1 | 5/2002 | Runge et al. |
| 2002/0072829 A1 | 6/2002 | Addink et al. |
| 2002/0166898 A1 | 11/2002 | Buhler et al. |
| 2002/0183935 A1 | 12/2002 | Skinner |
| 2003/0025400 A1 | 2/2003 | Hall |
| 2003/0080199 A1 | 5/2003 | Condreva |
| 2003/0093159 A1 | 5/2003 | Sieminski |
| 2003/0109964 A1 | 6/2003 | Addink et al. |
| 2003/0179102 A1 | 9/2003 | Barnes |
| 2003/0182022 A1 | 9/2003 | Addink et al. |
| 2003/0183018 A1 | 10/2003 | Addink et al. |
| 2003/0208306 A1 | 11/2003 | Addink et al. |
| 2004/0003045 A1 | 1/2004 | Tucker et al. |
| 2004/0011880 A1 | 1/2004 | Addink et al. |
| 2004/0015270 A1 | 1/2004 | Addink et al. |
| 2004/0039489 A1 | 2/2004 | Moore et al. |
| 2004/0089164 A1 | 5/2004 | Addink et al. |
| 2004/0217189 A1 | 11/2004 | Regli |
| 2004/0225412 A1 | 11/2004 | Alexanian |
| 2005/0082382 A1 | 4/2005 | Evelyn-Veere |
| 2005/0154498 A1 | 7/2005 | Townsend |

FOREIGN PATENT DOCUMENTS

| | | |
|---|---|---|
| WO | 0227419 | 9/2000 |
| WO | 0205045 | 1/2002 |
| WO | WO 2006/086610 A3 | 11/2007 |

OTHER PUBLICATIONS

Rainbird "Cirrus Central Control System", www.rainbird.com/golf/products/centralcontrol/cirrius.htm, last updated Jun. 14, 2005.

Aqua Conserve, Inc., ET-8B or ET-12B Product Specification, Aug. 11, 2003.

WIPO; "PCT International Preliminary Report on Patentability and Written Opinion of the International Searching Authority;" International Application No. PCT/US2006/004689; mailed Nov. 8, 2007; 6 pages.

FIG. 4

| Day | 0 | 1 | 2 | 3 | 4 | 5 | 6 | 7 | 8 | 9 | 10 |
|---|---|---|---|---|---|---|---|---|---|---|---|
| ET |  | 0.12 | 0.1 | 0.08 | 0.09 | -0.08 | 0.15 | 0.12 | 0.26 | 0.3 | 0.2 |
| Sum |  | 0.12 | 0.22 | 0.30 | 0.09 | 0.01 | 0.16 | 0.28 | 0.26 | 0.3 | 0.2 |
| LSD | LSD |  |  | LSD |  |  |  | LSD | LSD | LSD |  |

FIG. 5

| Day | 0 | 1 | 2 | 3 | 4 | 5 | 6 | 7 | 8 | 9 | 10 |
|---|---|---|---|---|---|---|---|---|---|---|---|
| ET |  | 0.1 | 0.09 | .012 | 0.14 | 0.06 | 0.11 | 0.16 | 0.29 | 0.4 | 0.2 |
| Ave. |  | 0.1 | 0.095 | 0.103 | 0.112 | 0.06 | 0.085 | 0.11 | 0.29 | 0.4 | 0.15 |
| LSD | LSD |  |  |  | LSD |  |  | LSD | LSD |  | LSD |

FIG. 7

Skipped Days Options
- ● Accumulated ET — 722
- ○ Average ET — 724

Minimum ET
- ☐ Minimum ET — 726
  - [1] 2 3 4 5 — 736
  - 740

- ○ Program: — 730
- ● Global Weather Station: — 732
- ○ Irrigation Class: — 734

Last Date Irrigated: XX/XX/XX — 742

[OK] [Cancel]

Skipped Days Options
- ● Accumulated ET
- ○ Average ET

Minimum ET
- ☑ Minimum ET
- ○ Program:
- ○ Global Weather Station:
- ● Irrigation Class: ~734
  - 1022~ 1-9 Greens ▼   ☐ Other Areas
  - A ▼ ~1024

Last Date Irrigated: XX/XX/XX

[OK] [Cancel]

Skipped Days Options
- ● Accumulated ET
- ○ Average ET

Minimum ET
- ☑ Minimum ET ~726   ~740
  - ■1 2 3 4 5 ~736   0.10 inches ~920
- ● Program: ~730
- ○ Global Weather Station:
- ○ Irrigation Class:

Last Date Irrigated: XX/XX/XX ~742

[OK] [Cancel]

~720

SYSTEM AND METHOD FOR WEATHER BASED IRRIGATION CONTROL

PRIORITY CLAIM

This application claims the benefit of U.S. Provisional Application No. 60/652,117, filed Feb. 11, 2005, entitled SYSTEM AND METHOD FOR WEATHER BASED IRRIGATION CONTROL, which is incorporated herein by reference in its entirety.

FIELD OF THE INVENTION

The present embodiments relate generally to irrigation, and more specifically to irrigation control.

BACKGROUND

Irrigating geographic areas can be very complex. Many systems employ a diverse irrigation program to efficiently supply appropriate amounts or water. Often in implementing irrigation, adjacent areas have very different watering needs adding to the complexity.

Many irrigation systems attempt to optimize the watering efficiency. Further, systems attempt to avoid over watering. Changing and varying weather conditions, however, often interfere with the optimal watering of plant life. Excess amounts water above what is needed by the plant life delivered from the irrigation system can damage plant life, which can be economically devastating for some irrigated areas such as agriculture, golf courses and other such areas. Further, the excess watering is wasted water resources and can be costly.

Some irrigation systems attempt to utilize historic weather conditions to determine an amount of water to supply through the irrigation system. These systems, however, do not provide accurate and efficient watering. Further, these systems often waste water because of slow response times and/or inaccurate data.

SUMMARY OF THE EMBODIMENTS

The present embodiments advantageously addresses the needs above as well as other needs through the provision of the method, apparatus, and system for use in providing control over an irrigation system. Some embodiments provide methods for controlling irrigation. Some of these methods receives a first current moisture loss value; determines a first net moisture loss value since a last irrigation start day utilizing the first current moisture loss value; retrieves a threshold moisture loss value associated with one or more watering programs controlled according to one of a plurality of selectable irrigation control levels where each level corresponds to a different way of associating threshold moisture loss values to watering programs; and defining a current day as an irrigation start day for the one or more watering programs associated with the first irrigation control level when the first net moisture loss value has a predetermined relationship with respect to the threshold moisture loss value.

In some implementations, some embodiments provide a computer readable medium encoded with one or more code segments for use by a processor causing the processor to perform steps comprising receiving a first current moisture loss value; determining a first net moisture loss value since a last irrigation start day utilizing the first current moisture loss value; retrieving a threshold moisture loss value associated with one or more watering programs controlled according to one of a plurality of selectable irrigation control levels where each level corresponds to a different way of associating threshold moisture loss values to watering programs; and defining a current day as an irrigation start day for the first irrigation control option when the first net moisture loss value a the predetermined relationship with respect to the threshold moisture loss value.

Some embodiments provide methods or systems for use in controlling an irrigation system. These methods identify one or more field stations of a plurality of field stations; associate an irrigation program with the one or more identified field stations; determine whether the irrigation program is to be activated based on a threshold moisture loss value; associate the irrigation program with a first irrigation control level of a plurality of selectable irrigation control levels when the irrigation program is to be activated based on a threshold moisture loss value, where the plurality of irrigation control levels correspond to different ways of associating threshold moisture loss values to irrigation programs; and identify a threshold moisture loss value associated with the first irrigation control level when the irrigation program is to be activated based on a threshold moisture loss value.

Other embodiments provide a computer readable medium encoded with one or more code segments for use by a processor causing the processor to perform steps comprising identifying one or more field stations of a plurality of field stations; associating an irrigation program with the one or more identified field stations; determining whether the irrigation program is to be activated based on a threshold moisture loss value; associating the irrigation program with a first irrigation control level of a plurality of selectable irrigation control levels when the irrigation program is to be activated based on a threshold moisture loss value, where the plurality of irrigation control levels correspond to different ways of associating threshold moisture loss values to irrigation programs; and identifying a threshold moisture loss value associated with the first irrigation control level when the irrigation program is to be activated based on a threshold moisture loss value.

Yet other embodiments provide methods for use in implementing irrigation, that select a first irrigation program; determine whether the first irrigation program is to be controlled based on a threshold moisture loss value; identify a first irrigation control level of a plurality of selectable irrigation control levels with which the first irrigation program is associated when the first irrigation program is to be controlled based on the threshold moisture loss value, wherein the plurality of irrigation control levels correspond to different ways of associating threshold moisture loss values to irrigation programs; identify a first threshold moisture loss value associated with a first irrigation control level associated with the first irrigation program; and authorize the activation of the first irrigation program when a net moisture loss value based on moisture loss since a last irrigation start day has a predefined relationship with the first threshold moisture loss value.

A better understanding of the features and advantages of the present invention will be obtained by reference to the following detailed description of the invention and accompanying drawings which set forth exemplary embodiment in which the principles of the invention are utilized.

BRIEF DESCRIPTION OF THE DRAWINGS

The above and other aspects, features and advantages of the present embodiments will be more apparent from the following more particular description thereof, presented in conjunction with the following drawings wherein:

FIG. 4 depicts a graphic representation of evapotranspiration (ET) values received by an irrigation system over a series of days according to accumulation based mnimmum ET control;

FIG. 5 shows a graphic representation of ET values received by an irrigation system over a series of days using averaging based minimum ET control;

FIG. 7 depicts an example of a graphical user interface that a user accesses in performing at least part of the process of FIG. 6;

FIG. 9 depicts the graphical user interface with a minimum ET option selected along with a program specific option;

FIG. 10 similarly depicts the user interface where a class option is selected;

Figure 1:
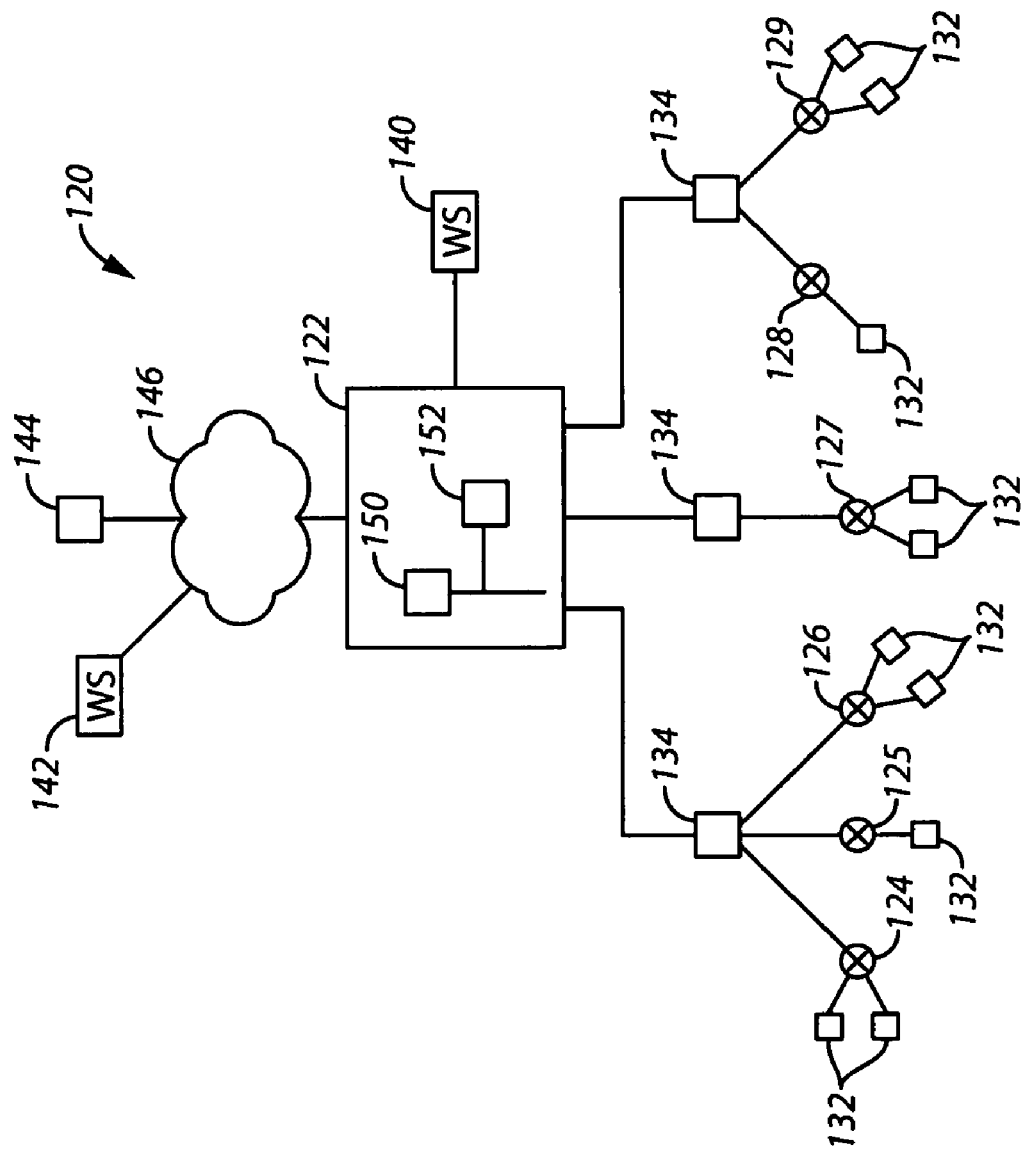
FIG. 1 depicts a simplified block diagram of an irrigation system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in implementing irrigation and/or watering of plant life. In part, these methods and systems attempt to optimize the irrigation and irrigation runtimes based on past and/or current weather conditions, and/or amounts of water loss from the plant life. These weather conditions are typically determined based on weather data, such as weather data from one or more local and/or remote weather stations, and are typically provided as a representation of water loss, and in some instances provided as evapotranspiration (ET) data or values. Based on the water loss some embodiments determine whether irrigation is to be initiated, and in some implementations, irrigation is initiated once a threshold water loss is detected. Further, some embodiments provide a user with a plurality of irrigation control levels and/or flexible options for controlling the irrigation of plant life based on the weather data for a global basis, a definable class basis, and/or a specific irrigation program basis. These levels and/or options allow the user to have greater control over irrigation implementation and further allow for quick and easy population of irrigation schedules.

As widely understood, an ET value is an estimated value that generally represents the amount of water that is evaporated and/or transpired by plant life (such as grass, crops, flowers, trees, and other plant life) in response to environmental conditions. As such, the ET generally estimates an amount of energy that should be supplied based on an estimate of how much water has been lost by plant life. An ET value is typically a function of temperatures, humidity, wind, solar radiation, an amount of rainfall, moisture in the ground, and other such relevant weather data. Further, one or more ET values can be used to define and/or determine an amount of water loss from plant life. In some embodiments, the ET value or data is used by an irrigation control process in determining an amount of water to apply during irrigation to the plant life.

The ET values can be obtained from any number of sources, such as one or more local or remote weather stations that calculate and/or estimate ET values, a service that can be contacted to receive the ET value, publications and other such sources. The ET value is often determined daily based on detected weather conditions. ET values are most commonly expressed in units of inches or millimeters (mm), i.e., inches or mm of water that are lost or consumed by plant life during that day. For example, an ET value for one day may be 0.12 inches, which means that the plant life has lost 0.12 inches of water during that day. It is noted that the ET values are described as being based on daily values, however, the ET values can be based on substantially any interval or predefined time period.

Utilizing the water loss, weather and/or ET value(s), some embodiments determine whether to initiate watering and calculate an amount of water that should be supplied to the plant life when watering is to be initiated. Some embodiments use a threshold water loss or threshold ET to determine when watering should occur. This threshold ET can, for example, be a minimum ET level that has to be reached before irrigation is initiated. Further, the determination of whether a minimum ET level has been reached can be based on a summation and/or averaging of multiple periodically received ET values for a series of days. The ET data is further used in calculating amounts of water to supply during irrigation. Additionally, the type of plant life being watered can also be taken into account as well as the type of soil, saturation and absorption rates of the soil, the slope of the ground, and other factors. Based on the determined amount of water (and/or type of soil, saturation and absorption rates, slope of the ground and other factors), irrigation runtimes and scheduling are determined to accurately deliver the desired amount of water. Furthermore, the minimum ET values can vary or be defined to change over time to compensate for changing weather patterns, seasons, or the changing needs of the plant life to be irrigated. For example, the minimum ET can be defined at a first level during winter, a second level for spring, a third for summer and a fourth for fall. In another example, one minimum ET value can be assigned for freshly planted plant life and changed to a different minimum ET once the plant life is sufficiently grown in or matured. Other such variations in the minimum ET values can be utilized.

Some embodiments further provide a user with irrigation control levels and flexible irrigation options to allow the user to more fully control the irrigation of the plant life. These levels in part allow an irrigation system and/or controller to be more easily and quickly activated and put on-line to control irrigation, adjust irrigation schedules, as well as to allow levels of precision in controlling the irrigation. For example, these control levels can include a general or global level where multiple programs can be globally controlled in a uniform manner based on weather data, class levels where one or more programs belonging to defined classes can be uniformly controlled based on weather data, and program specific levels where individual programs may be separately controlled based on weather data. Other levels of precision can be included without departing from the novel aspects of the present embodiments. An irrigation system typically includes multiple watering programs, each program defined to control the watering at different regions in the irrigation system. Some embodiments allow one or more of the plurality of programs, typically having similar watering criteria and/or watering similar plant life, to be grouped together and provide general control over the plurality of programs through simplified and reduced numbers of parameters. Further, the global level is a general designation that incorporates irrigation programs that are not defined as class or program specific. It is possible to have multiple global values, each associated with an ET source; i.e., weather station 1 may have global minimum ET "collector" different from weather station 2 and so on. The irrigation system can have any number of classes depending on the size of the system and the complexity of the watering needs. Similar to class level programs, the global level allows the control of a plurality of programs through a single set of parameters.

FIG. 1 depicts a simplified block diagram of an irrigation system 120 according to some embodiments. The system 120 includes an irrigation system central controller 122; one or more valves and/or field stations 124-129 that cooperate with one or more sprinklers, rotors, drip-lines, and/or other water delivery devices 132; optional sub-controllers 134 (also referred to as satellite controllers); and one or more weather data sources (such as ET data sources). These ET source(s) can include local weather stations 140, remote weather stations 142, and/or other sources 144 such as a remote database that supplies ET data.

Figure 2:
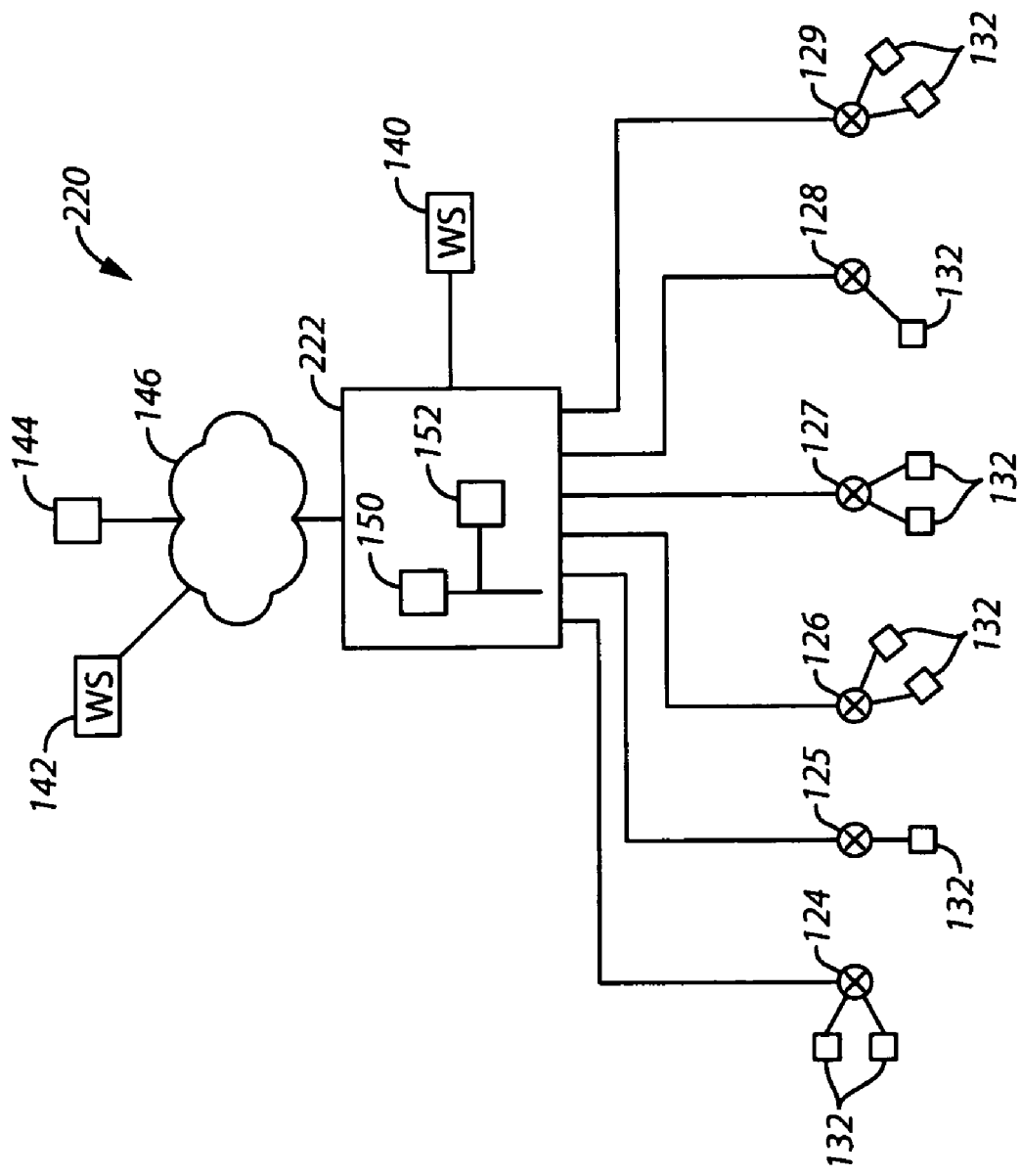
FIG. 2 depicts a simplified block diagram of an alternative irrigation system.

FIG. 2 depicts a simplified block diagram of an alternative irrigation system 220. The system 220 includes a controller 222 (e.g., a stand alone controller that may or may not be coupled to a central controller or other supervisory controller); one or more valves and/or field stations 124-129 that cooperate with one or more sprinklers, rotors, drip-lines, and/or other water delivery devices 132; and one or more ET or other weather data sources.

Referring to FIGS. 1 and 2, the central controller 122, controller 222 and/or sub-controllers 134 utilize the received ET and/or other weather data to control the system 120, 220 in real time and to initiate the activation of the field stations 124-129 to supply water to the water delivery devices 132. The central controller 122 and/or controller 222 include one or more processors or microprocessors 150 that provide overall functionality, data processing, and control over the system. Memory 152 is further included that stores software programs, executables, data, irrigation control programming, scheduling, runtime parameters, soil conditions and parameters, other relevant programs and data, and instructions executable by a processor, machine or computer. The memory can be implemented through ROM, RAM, disk drives, flash memory, removable medium (e.g., floppy disc, hard disc, compact disc (CD), digital versatile disc (DVD) and the like), and substantially any other relevant memory or combinations of memory. Generically, the memory 152 may also be referred to as a computer readable medium. The irrigation control provided through controllers 122, 222 may be implemented by software stored in memory and executed on the processor 150, or otherwise stored and executed in firmware. Further, the one or more processors can be implemented through logic devices, hardware, firmware and/or combinations thereof. Thus, the control processor described herein may be performed using substantially any relevant processor logic or logic circuitry. In some embodiments, the controller 122, 222 is implemented through a computer running software and/or firmware to implement irrigation control applying minimum ET evaluations as described above and further below.

Figure 14:
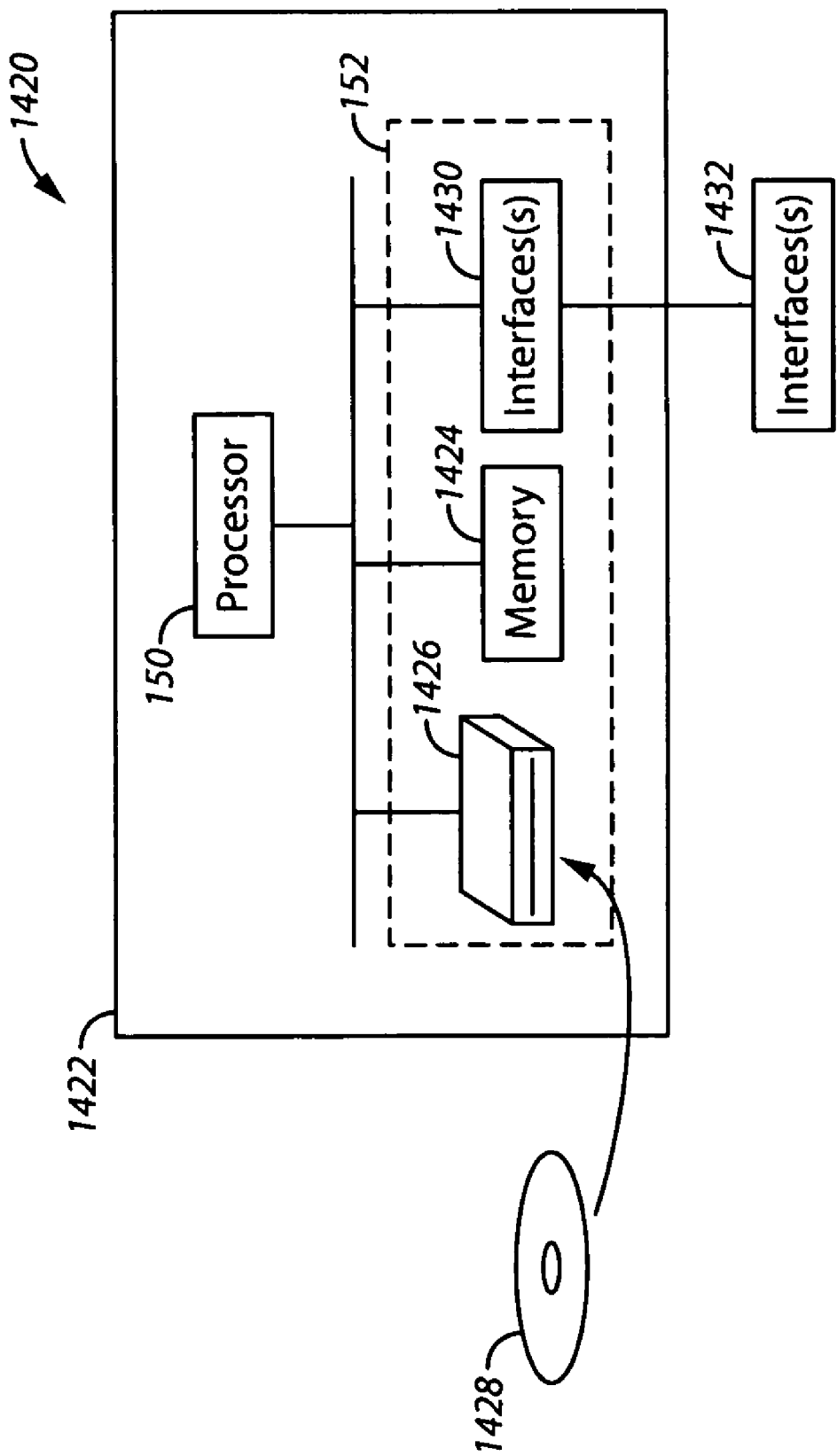
FIG. 14 depicts a simplified block diagram a controller according to some embodiments than can be utilized with the systems of FIGS. 1 and 2.

FIG. 14 depicts a simplified block diagram of a controller 1420 according to some embodiments than can be utilized in implementing some or all of the central controller 122 and/or controller 222. In some implementations, the controller 1420 is implemented through a computer 1422 includes one or more processors 150, such as a microprocessor and/or other processors. The computer further includes memory 152. The memory can include memory 1424 implemented through ROM, RAM, disk drives, flash memory and substantially any other relevant memory or combinations of memory. Further, the memory can include one or more drives 1426 that receive removable medium 1428 such as floppy disc, hard disc, CD(s), DVD(s), flash memory and other relevant removable medium. The controller can further include one or more interfaces 1430, such as a network interface and/or wireless interface to access other remote memory 1432 that can be implemented through ROM, RAM, disk drives, flash memory, removable medium (e.g., floppy disc, hard disc, CD(s), DVD (s) and the like), and substantially any other relevant memory or combinations of memory.

Referring to FIGS. 1 and 2, as indicated above, the ET values can be received from one or more local weather stations 140, and/or from remote weather stations 142 through a network 146, such as an intranet or an extranet (e.g., the Internet) or substantially any other relevant computer network. It is understood, however, that the network 146 can be substantially any relevant wired or wireless communication network or networks to communicate data, such as public switched telephone network (PSTN), cellular, paging, radio frequency broadcast, hybrid networks of one or more of fiber, cable and/or satellite, and other relevant networks.

In some implementations, the central controller 122 or controller 222 further couples with a remote data source 144, such as a remote database accessed through a server that publishes information and other such data relevant to weather data and/or the determination of a local ET. For example, geographic ET data can be retrieved from an internet site and adjusted by the controller for accurate watering of a specific crop. The controller 122, 222 utilizes the ET value(s) to determine if and when irrigation is to be initiated, which of the stations 124-129 are to be activated, and the runtimes for each station. In some implementations, the central controller 122 delegates some or all of the determination, control, runtime calculations for the stations, and/or irrigation activation to the sub-controllers 134. For example, in some implementations, a determination of whether irrigation is to occur and the runtimes are calculated at the central controller 122 and forwarded to the sub-controllers 134. The central controller 122, controller 222 and/or sub-controllers 134 then activate the stations according to the received runtimes and irrigation scheduling.

Figure 3:
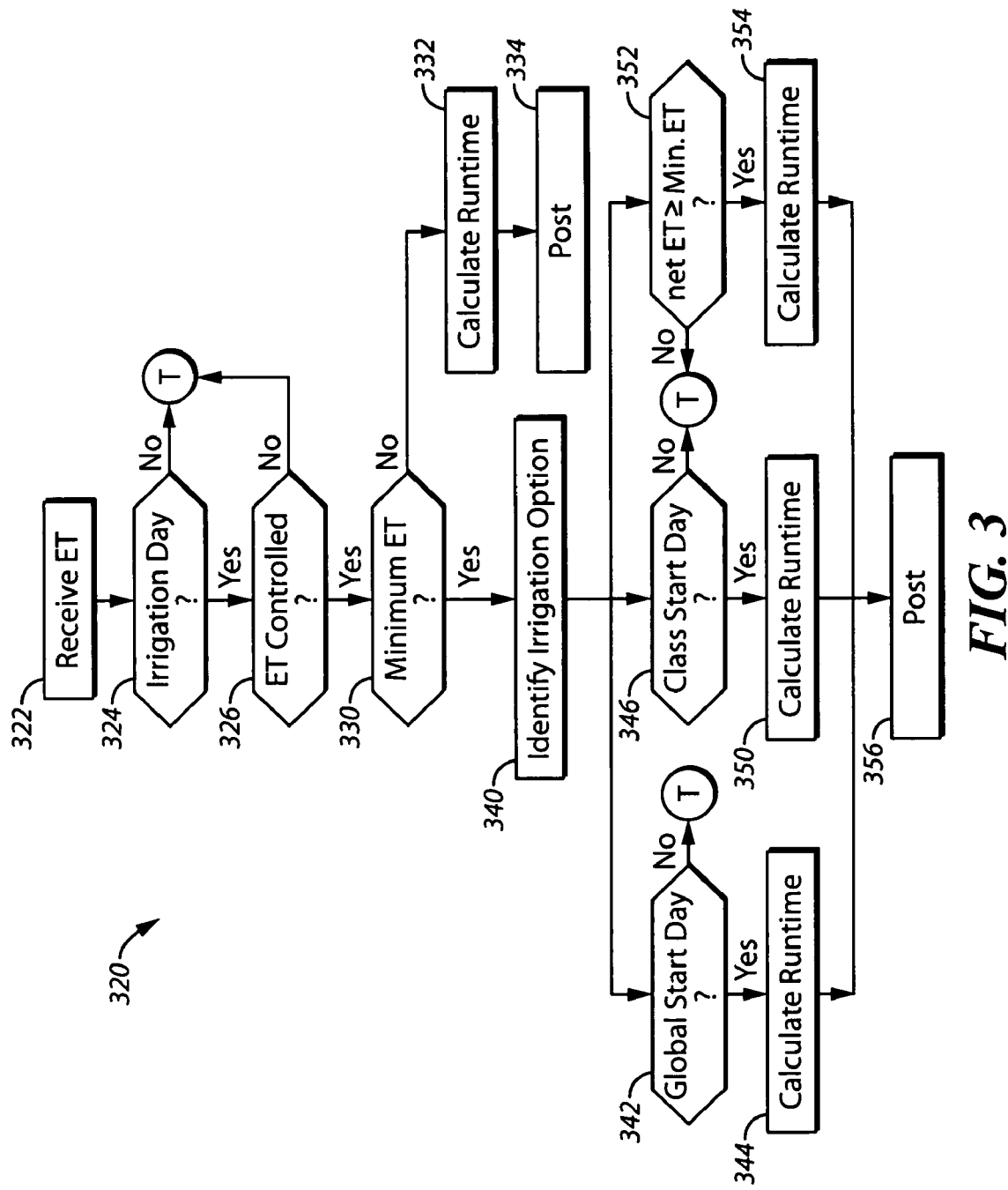
FIG. 3 depicts a simplified flow diagram of a process for use in irrigating that is implemented by an irrigation controller to control the system to irrigate desired plant life.

FIG. 3 depicts a simplified flow diagram of a process 320 for irrigating that is implemented through the central controller 122, controller 222 and/or sub-controllers 134 to control the system 120, 220 to irrigate desired plant life according to some embodiments. In step 322, one or more ET values are received. In step 324, the process determines whether a current day is defined as an irrigation day. In some implementations, the controller 122, 222 can be configured and/or programmed to prevent irrigation from occurring on a certain day, for example, a user can designate every Monday as a non-watering day, or designate the first day of each month as a non-water day, or other such scheduling. When the current day is a non-irrigation day, the determination process to irrigate or not terminates.

When it is determined in step 324 that the current day is an irrigation day, step 326 is entered where the process determines whether the irrigation program in question is to be based on the received ET. When the program is not based on ET, the process terminates, and irrigation is initiated through the controller that typically applies predefined runtimes or other irrigation scheduling for that program. Alternatively, when the program is controlled based on ET, step 330 is entered and the process determines whether the program uses the minimum ET option. For those programs not utilizing or requiring a minimum ET, step 332 is entered where runtimes are determined based on the current day's received ET. The calculation of runtimes typically is based on irrigation or precipitation rates for each field station based on a known amount of water delivered by the station (e.g., based on type of sprinkler or other water delivery device, the water pressure applied to the station, the area being irrigated, and other such parameters) and the ET. In step 334, the runtimes are posted and activation of the irrigation for those identified stations is initiated according to the irrigation schedule.

For those programs that are activated based on a minimum ET, the process enters step 340 where it determines which minimum ET control level and/or option is selected. For example, in some implementations, a program can be defined to track a global, a class, or a program specific minimum ET. In step 342, a global minimum ET is evaluated to determine whether the program is to be activated. When the current day is not a global start day, as determined previously, in some implementations, at the time the ET source is updated for that day, the process terminates and no irrigation is initiated for this program. Alternatively, step 344 is entered where runtimes for the stations in this program are determined. In step 346, the selected class specific minimum ET start day is examined to determine whether the program is to be activated. When the current day is not a class start day, the program is not to be activated and the process terminates. Alternatively, step 350 is entered where runtimes for each station in the program are determined. In step 352, the program specific minimum ET specified is evaluated to determine whether the program is to be activated. For those programs that are not to be activated the process terminates. Alternatively, step 354 is entered where runtimes for each station for the program are determined. In step 356, the runtimes are posted and those stations to be activated are initiated at defined times according to the irrigation schedule for the determined runtimes.

Determining whether to activate stations in the program, as indicated above, can be bases on whether the threshold or minimum ET has been reached, which promotes deep root growth, healthy plant growth, and conserves valuable water resources. Further, the ET values from one or more previous days where irrigation was not initiated can be summed and/or averaged. When the sum or average ET meets or exceeds the minimum threshold, the irrigation runtime is calculated based on the sum or average ET. Therefore, some embodiments initiate irrigation through identified programs when the sum or average ET exceeds the minimum ET threshold.

For example, with a minimum ET value set at 0.25 inches based on an accumulation or summation, some embodiments avoid watering until an accumulated ET meets or exceeds the threshold 0.25 inches (i.e., the plant life has lost approximately 0.25 inches of water). Alternatively and/or additionally, some embodiments base the ET threshold on an averaged minimum ET such that an average ET value should exceed the minimum ET before watering is initiated. Some embodiments, however, allow a user to override the irrigation control based on the minimum ET if the user chooses to water before the minimum ET is reached. In some instances, once an override is activated, some embodiments reset a last irrigation start day parameter equal to the overridden day and the accumulation and/or averaging begins over from the newly defined last start day. Alternatively in some instances, the last start day parameter is not reset and remains the same, and the system 120 waters accordingly once the minimum ET value is reached (i.e., ignoring the additional override watering by the user).

FIG. 4 depicts a graphic representation of examples of ET values 422 received by an irrigation system 120, 220 over a series of days 424 according to accumulation based minimum ET. Starting from the last day of watering 426 (day 0), the ET values 422 received and/or determined on day 1 is 0.12, on day 2 is 0.10, on day 3 is 0.08, on day 4 is 0.09, on day five is −0.08, on day 6 is 0.15, on day 7 is 0.12, on day 8 is 0.26, on day 9 is 0.3, and on day 10 is 0.2 inches. Using the accumulation or summation based minimum ET, the ET values 430 are summed from the last start day (LSD) for watering 426 until a minimum threshold ET value is attained. For example, the minimum ET can be set to 0.25 inches. According to this example, the controller 122, 222 would not allow the next watering to begin until day 3, when the accumulated ET reaches the minimum value of 0.25. In this case, the accumulated ET is 0.30 inches on day 3. Accordingly, the irrigation system then waters on day 3 providing real time irrigation control. In some embodiments, the system further determines an amount of water to supply based on the accumulated ET value, and in this example, would attempt to supply 0.30 inches of water (which represents the amount of water lost since the last start day). The system redefines the last start day (LSD) 426 as day 3, clears the summation of the ET values, and begins again to accumulate the ET values. In this instance, on day 4 watering would not occur because the sum of ET values is only 0.09 (i.e., just the ET value for day 4).

It is also possible that a given ET for a given day may be negative, for example, rain is received on day 5 where the ET is −0.08. Accordingly, watering following the new last start day of day 3 would not be initiated until day 7 since day 7 is the first day that the accumulated ET reaches or exceeds the minimum ET, set in this example to 0.25. Thus, on day 7 the irrigation system initiates watering. Again, the system may utilize the accumulated ET of 0.28 on day 7 to identify an amount of water to supply. Further, the system redefines the last start day (LSD) 426 as day 7, clears the summation of the ET values, and begins again to accumulate the ET values. Further, watering can be activated on consecutive days with substantially no limit to the number of consecutive days if the ET values for those days exceed the minimum ET. As shown in this example, irrigation is activated on days 8 and 9 based on the accumulated ET values for these days exceeding the minimum ET value.

Some embodiments can additionally and/or alternatively utilize an averaged ET to control when irrigation is initiated. FIG. 5 shows a graphic representation of ET values 522 received by an irrigation system 120, 220 over a series of days 524 using averaging based minimum ET control. Starting from the last day of watering 526 (day 0), the ET 522 on day 1 is 0.10, on day 2 is 0.09, on day 3 is 0.12, on day 4 is 0.14, on day five is 0.06, on day 6 is 0.11, on day 7 is 0.16, on day 8 is 0.29, on day 9 is 0.10, and on day 10 is 0.20 inches. The average of the ET values 530 is calculated from the last day of watering 526. When the average ET value meets or exceeds a minimum ET, watering is initiated. In the example shown in FIG. 5, if the minimum ET value is set to 0.11 inches, irrigation would not be initiated until day 4 at which time the average ET for the four days since the last start day (LSD) (days 1-4) equals 0.112 inches, and delivers about 0.112 inches of water. The average ET is reset and the system again monitors the average ET. Watering is again initiated according to the example of FIG. 5 on days 7, 8 and 10 when again the averages exceed the minimum ET. In some implementations, the average ET is used when irrigation is generally not desired every day. In some implementations, the average ET is used when default runtimes correspond to typical water conditions reflected by a reference ET while the typical start day pattern are not daily.

As described above, some embodiments further control the irrigation according to defined irrigation levels that allow the system to define stations according to levels of irrigation precision, and in some instances correspond to different ways of associating the threshold moisture loss to watering programs. The irritation levels include, in some implementations, program specific level(s), class level(s), and a global level. Through the program specific level, one or more stations 124-129 are specifically controlled through individually specified and locally determined minimum ET values. Typically, a program controls one or more stations for a limited area or region and includes the watering schedule for those stations. For example, a golf course typically includes multiple programs for each hole, such as one or more programs for the stations watering the fairway of the hole, one or more programs for watering the green of the hole, one or more programs for watering the tee box of the hole, one or more programs for watering the rough proximate that hole, one or more programs for watering other plant life adjacent or near the hole, and other such programs. Using the program specific option, a minimum ET value can be set for each designated program to precisely control the irrigation for those areas watered based on the specific program.

The class level allows a user to group programs together into a class and set minimum ET values for the class. Again continuing with the golf course example, a user can define all greens for the first nine holes as a first class with a first minimum ET, all greens for a second nine holes as a second class with a second minimum ET, all fairways of the first nine holes as a third class with a third minimum ET, all fairways of the second nine holes as a fourth class with a fourth minimum ET, and flowers along portions of the fairways and around the club house as a fifth class with a fifth minimum ET. By defining classes a user can control multiple programs with each program based on a class defined minimum ET specific for the watering needs of that particular plant life class.

The global level sets a single global minimum ET that is used by non-class or non-program specific stations. Typically, this global minimum ET is based on or tracks the daily ET values received from one or more ET sources, such as an ET value received from a weather station using that value and/or determining a global ET value. This weather station ET is combined with previously obtained ET values since the last global start day and compared with the global minimum ET and the determination of whether to activate all of the global programs is made based on the accumulated or averaged weather station ET. Thus, a plurality of irrigation programs for one or more stations are controlled based on the global minimum ET when these programs controlling watering at different regions of the area being irrigated are not specifically defined and/or are not associated with a class.

By providing irrigation levels, some embodiments provide a user with greater control over the areas to be irrigated. Further, the use of global and class designations simplifies initial configuration of the system as well as later adjustments as an adjustment is applied to a plurality of stations (i.e., one adjustment applies to each globally tracking program, or one adjustment that applies to each station of a class, or to each station controlled by a specific program). Further, the class and program specific levels allow a user to more precisely control watering, enhance plant growth and deep root growth, while saving water.

Figure 6:
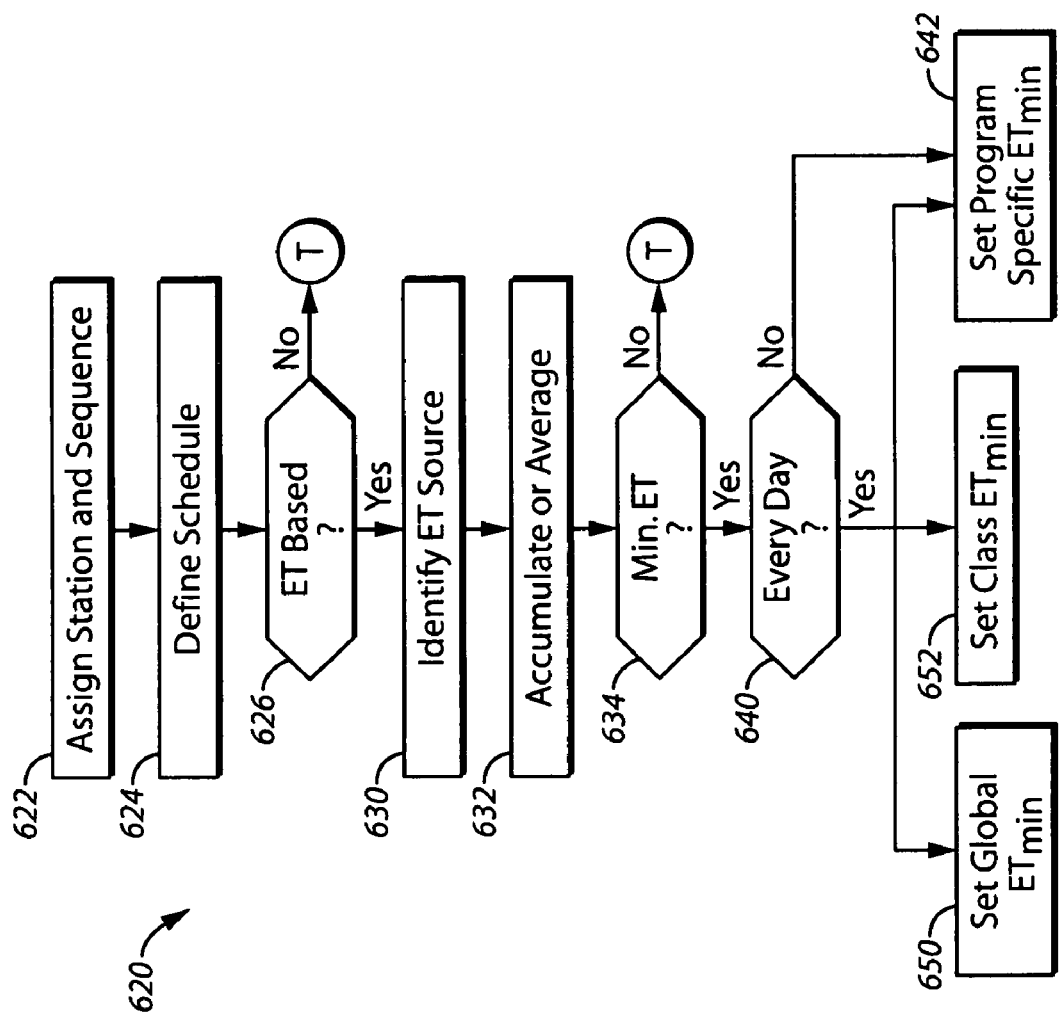
FIG. 6 depicts a simplified flow diagram of a process for establishing and/or setting up programs, classes and/or global conditions.

FIG. 6 depicts a simplified flow diagram of a process 620 for establishing and/or setting up programs, classes and/or global conditions. In step 622, one or more field stations are identified and the irrigation sequence is determined. Typically, a user identifies one or more stations, and the system and/or user coordinates the sequence of that station with other related stations, such as stations operating from the same water supply line. In step 624, an irrigation schedule is defined. Again, the system typically receives scheduling from a user that identifies days where irrigation is allowed, start times, and/or days where irrigation is not allowed. For example, a user may define some stations as available to water daily, which in some implementations achieves the most benefit from the accumulated minimum ET. Other stations can be defined with certain days when watering cannot occur, such as days where maintenance is to be performed proximate those stations (e.g., days when a fairway is to be mowed).

In step 626, it is determined whether the program is defined as being ET base controlled. For those programs that are identified as not utilizing ET data, the process 620 terminates. Alternatively, for those programs that are identified as utilizing ET data, step 630 is entered where one or more ET sources are identified from which ET data is to be received in determining irrigation based on the received ET values. For example, a first program may be associated with a first weather station, a second program may be associated with second and third weather stations, and a third program may use ET data from the third weather station as well as remote ET data, such as historic ET data accessed over the distributed network 146 from a remote source 144.

In step 632, programs are identified as utilizing accumulated ET data or averaged ET data in determining when to activate and amounts of water to supply when activated. In step 634, programs are defined as referencing a minimum ET data in determining whether the stations in the program are to be activated. For those programs that do not reference a minimum ET the process 620 terminates. Those programs that are defined as needing to satisfy a minimum ET prior to initiating irrigation, the process continues to step 640 where it is determined whether the program is defined to start every day or having start days specifically defined where one or more days are intentionally skipped. Typically, step 640 references the sequences for stations defined in step 622. In some embodiments, for those programs that are not defined to start every day, the process 620 shifts to step 642 where a program specific minimum ET is imposed. For those programs that are defined in step 640 as every day starts, where the stations could be activated every day if the day's ET value, the accumulated ET values, and/or the averaged ET values exceed the minimum ET(s), the process determines whether the program uses global, class, or program specific minimum ET. When the program is defined to use global minimum ET, step 650 is entered, where a global minimum ET value is inserted, which in some implementations was previously set at the weather station (or alternate ET source) for the global programs referencing this ET source. When the program is defined to use a class minimum ET, step 652 is entered, where the class minimum ET is inserted, which was previously set at the class minimum ET definition for the stations referencing this class. In some implementations, the assignment of stations to a class is performed in an initial system setup and is part of a database characterizing each station, and thus, the program targets a specific class. Further, the stations defined by this program are subjected to this class minimum ET. When the program is defined to use a program specific minimum ET, the process continues to step 642, where this minimum ET value is defined.

The process 620 allows for the quick and easy population of the irrigation control and scheduling. Further, the process quickly coordinates the stations and defines the levels providing greater control over the irrigation system.

FIG. 7 depicts an example of a graphical user interface 720 that a user accesses in performing at least part of the process 620 of FIG. 6 according to some embodiments. As can be seen, the user can select Accumulated ET 722 or Average ET 724 in designating how the ET values are used on those days where watering is skipped. Further, the user can identify whether a minimum ET value is used or not 726. The user additionally selects between the available irrigation control levels of program specific 730, global weather station 732 and irrigation class 734. In the example shown in FIG. 7, the use of the minimum ET is selected with the global irrigation control weather station level 732 selected, and from a possible of five different weather stations or ET sources 736 one of weather station (e.g., station 1) 736 is selected. It will be apparent to those skilled in the art that substantially any number of ET sources can be available, one or more sources can be selected, and the access to those sources can be defined in other user interfaces. The user interface 720 in this example also identifies the last irrigation start day 742 for the selected global option. The selections and/or data entry for user interface 720 can be implemented through a keyboard, pointing device (e.g., mouse, stylist and the like), touch screen and/or other such relevant selection and/or data entry devices.

Figure 8:
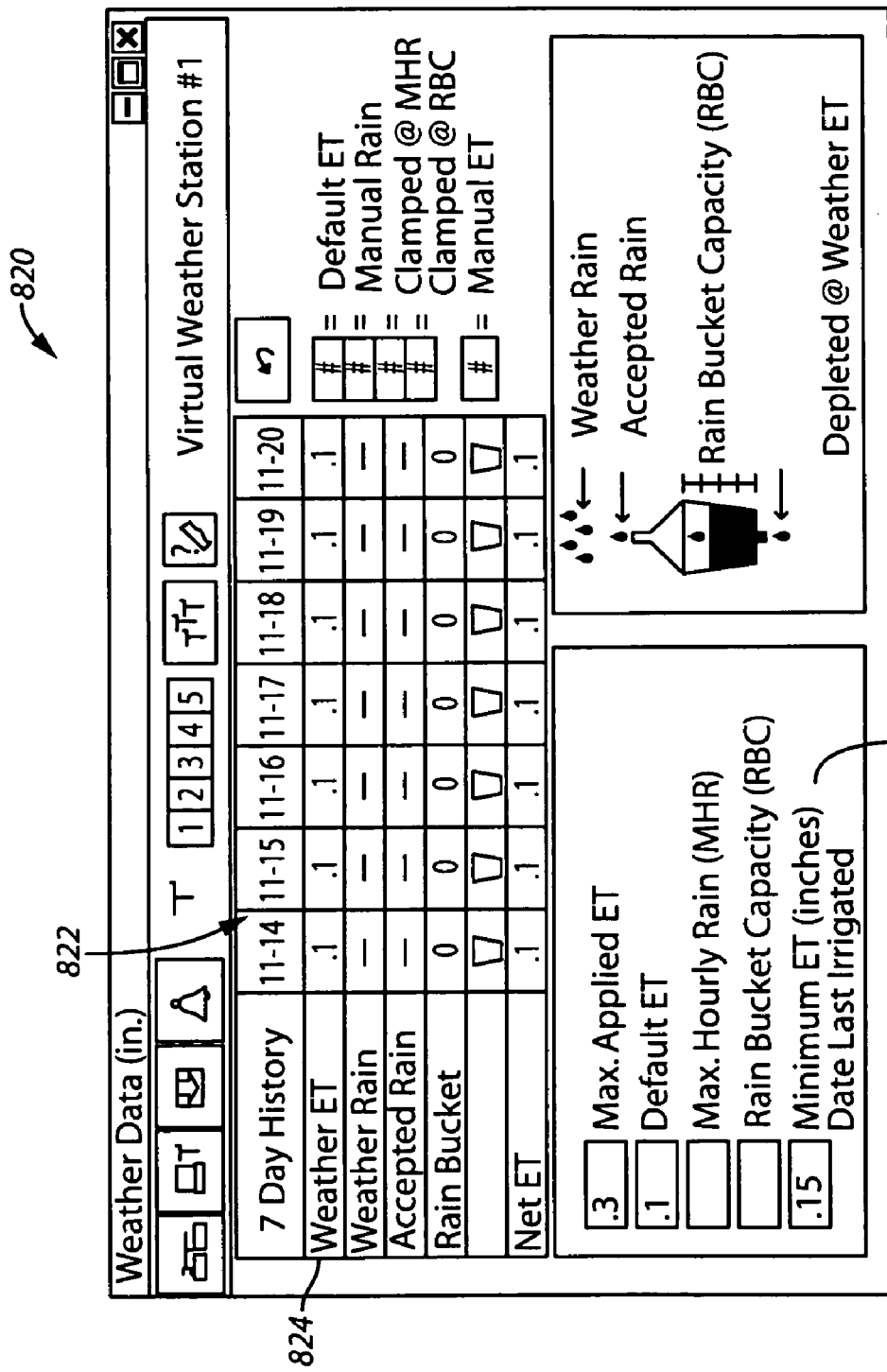
FIG. 8 depicts an example of the defined weather data user interface having a stack such as a seven day stack.

In some implementations, the global minimum ET value is based on a weather station global minimum ET received from the designated ET source. Alternatively and/or additionally, the global minimum ET can be designated through another user interface, such as a defined weather data interface 820. FIG. 8 depicts an example of the defined weather data user interface 820 having a stack 822 such as a seven day stack. The received weather and/or ET data 824 is compared with a global minimum ET entered through a minimum ET entry option or field 826, which in some implementations is variable over time (e.g., changes per month to adjust to changing weather patterns) and/or changed by a user based on current weather trends. In the example shown in FIGS. 7 and 8, those programs defined as tracking global minimum ET use the ET from the first weather station 740 and its global minimum ET 826, and for those days that are skipped because the accumulated or averaged ET does not exceed the minimum ET the ET data is further accumulated and/or averaged.

Figure 11:
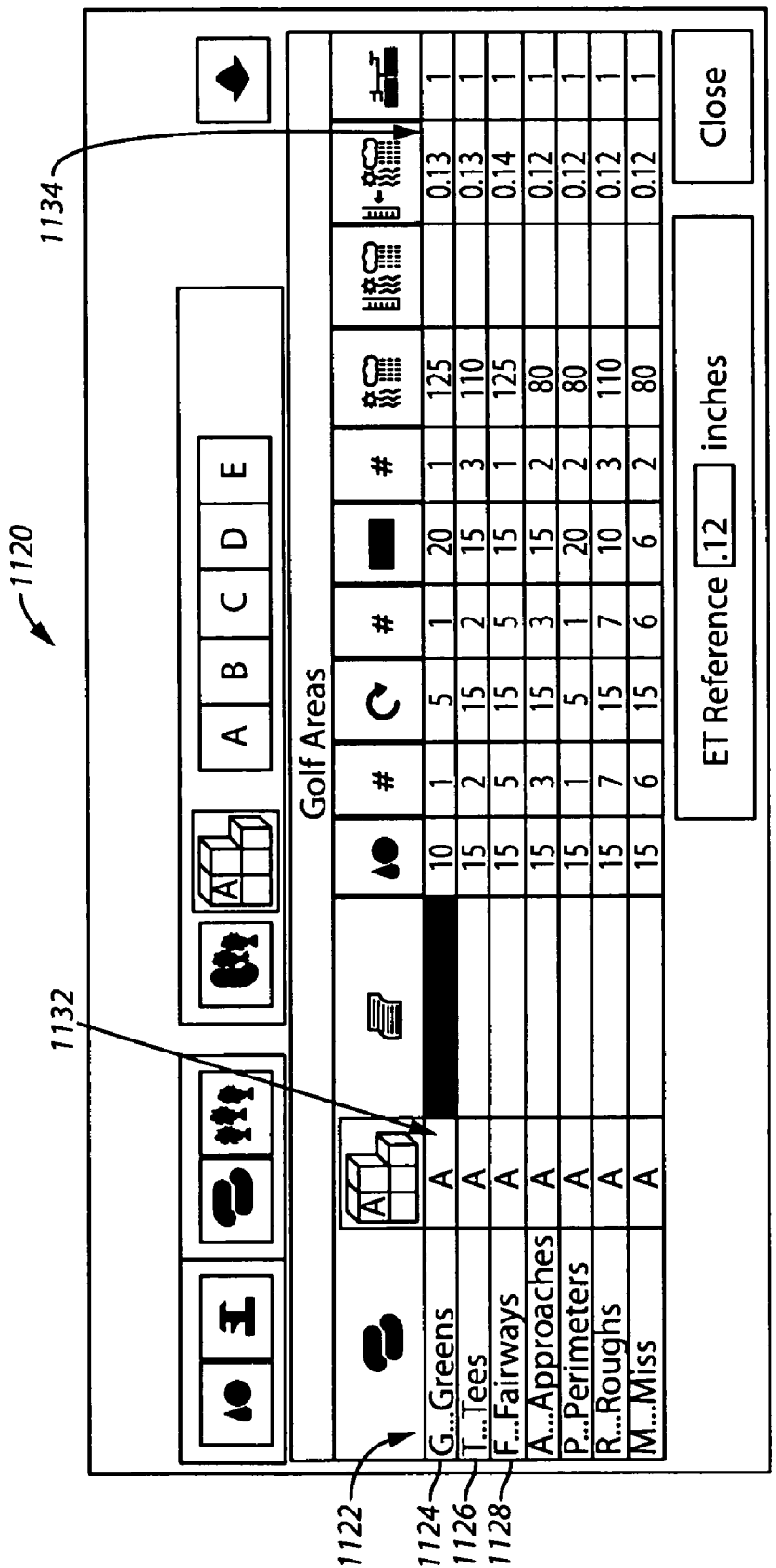
FIG. 11 shows an example of the user interface for use in defining one or more classes.

FIG. 9 depicts the graphical user interface 720 with the minimum ET option 726 selected along with the program specific level 730. Further, a minimum ET value filed 920 is included where a minimum ET value is entered and/or displayed for the current specific program and again the first ET source (source 1) 740 is selected for the ET data from the possible sources 736. Again, the minimum ET can vary over time. Additionally, the last irrigation start day 742 is designated for the current specific program. FIG. 10 similarly depicts the user interface 720 where a class level 734 is selected. Additional fields are provided for designating the class 1022 along with one or more ET sources 1024. The selections of a class of the class level are defined, in some embodiments, through an additional user interface 1120. FIG. 11 shows an example of the user interface 1120 for use in defining one or more classes or class options 1122, such as Greens 1124, tees 1126, fairways 1128 and other classes. Sub-classes can also be defined in some embodiments to provide more precise control of similar plant life that may have variations (e.g., slope of ground affecting how quickly water begins to run off and is not utilized). Similarly, the one or more weather and/or ET sources can be selected 1132. Further, the minimum ET values 1134 are designated for each defined class along with additional information for defining the class. In some embodiments, the minimum ET value can additionally or alternatively be specified through the user interface 720 of FIG. 10 or other user interface. The additional information can include, for example, time at which run-off begins, time for soil to absorb water and be ready to again receive water (e.g., for cycle and soak procedures), and other such information. The user interface 1120 can additionally allow multiple minimum ET values to be specified and times of the year, month or other time frame when those additional ET values are to be applied allowing the minimum ET value to vary over time. Alternatively, the user can manually adjust the minimum ET over the month, year or as desired.

Some embodiments utilize the defined minimum ET values along with the defined options in determining in real time which if any stations are to be activated and to coordinate the irrigating. Again, the minimum ET can be advantageously used at least in part to promote deep root growth and healthier plants, while saving water. Further, the irrigation options allow a user to more precisely control the irrigation as well as simplify the setup and adjustment of the irrigation scheduling.

Figure 12:
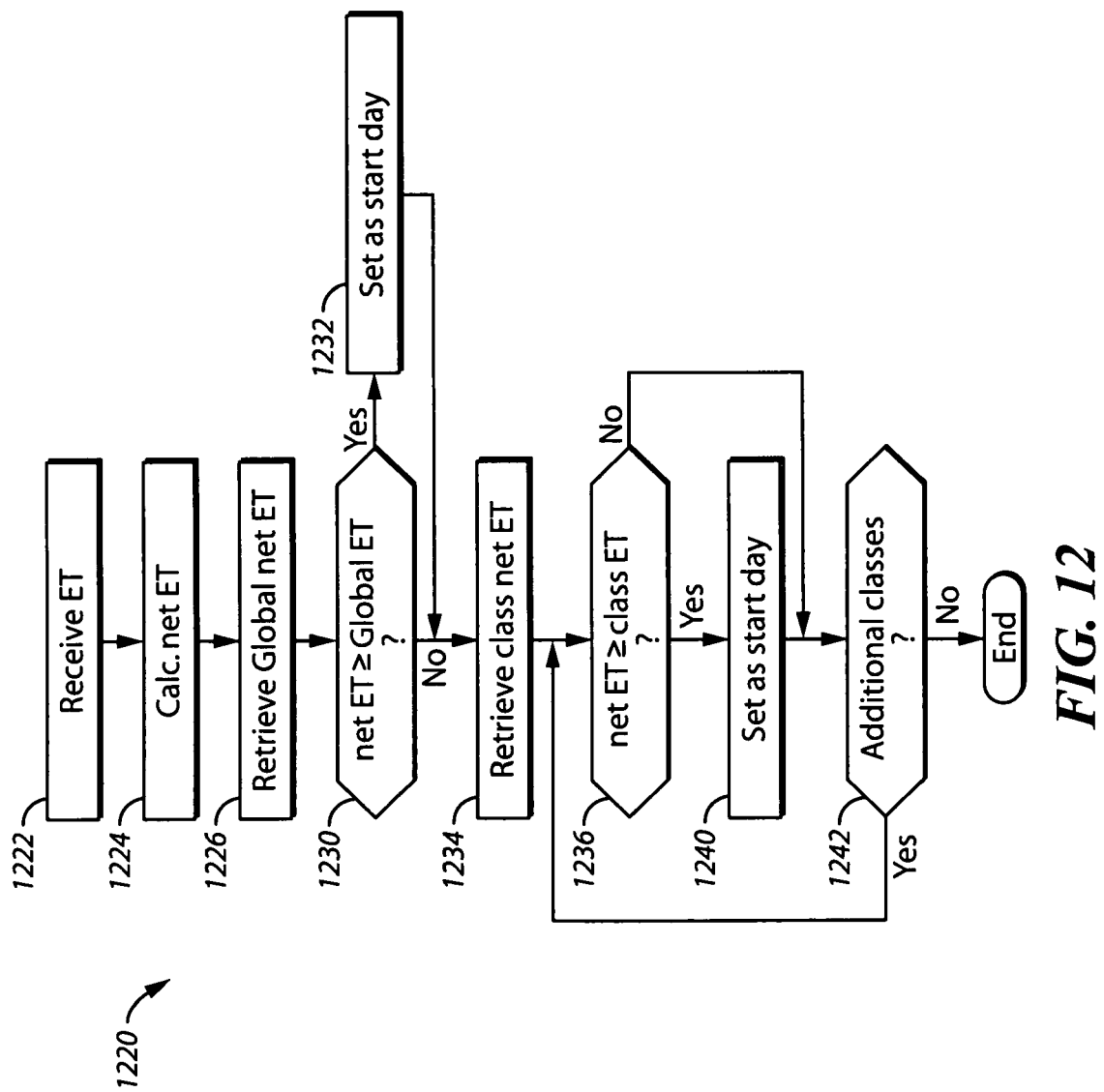
FIG. 12 depicts a simplified flow diagram of a process that initially evaluates one or more received ET values in determining whether irrigation is to be activated on a given day.

FIG. 12 depicts a simplified flow diagram of a process 1220 that initially evaluates one or more received ET values in determining whether irrigation is to be activated on a given day (e.g., a current day). In step 1222, one or more ET values are received from one or more ET sources. Again, the sources for ET values can be from local and/or remote weather stations, databases of values, remote services that supply values, calculated at the controller from weather data supplied from sources, and other such sources and/or combinations of sources. In step 1224, one or more daily ET are determined. Typically, when ET data is received from a local weather station, the ET data received in step 1222 is defined as the daily ET. In some instances, however, multiple ET values are received from multiple sources and the process performs some adjustment to determine a daily ET. For example, when multiple ET values are received from multiple local weather stations, the daily ET can be an average of the received ET values. Other adjustments or determinations can be incorporated in step 1224, such as adjustments based on historic data, a determination of which of a plurality of ET values is related to a specific plant life or region of interest, and other such adjustments or determinations.

In step 1226, the process 1220 retrieves a global net ET stack, which is a summation and/or average of the daily ET values since the last start day where global watering was initiated. Further, the daily ET from step 1224 is added and/or averaged with the net ET stack to provide a revised net ET since the last irrigation start day. In step 1230, a comparison of the summed or averaged net ET since the last start day is compared with a global minimum ET value. The global minimum ET can be set, for example, by the user, a default can be used, or the minimum ET can be set by a minimum ET value at a weather station or remote data source (e.g., a database can be accessed and one or more minimum ET values retrieved based on plants to be irrigated, geographic location of plants and/or other factors. When the sum or average net ET value is greater than or equal to the global minimum ET the process continues to step 1232 where the current day is set as a global start day. In step 1234, a class minimum ET value is retrieved when one or more classes have been defined. In step 1236, a summed or averaged net class ET value is determined based on the retrieved ET and the class net ET, and the current net class ET is compared with a class minimum ET. If the summed or averaged net class ET is greater than or equals the class minimum ET step 1240 is entered where the current day is set as a class irrigation start day for the related class. In step 1242, it is determined whether further classes need to be evaluated (i.e., comparing summed or averaged net class ET of the specific classes with additional class minimum ETs). When additional class ET values are to be evaluated, the process returns to step 1234 to retrieve an additional class minimum ET.

The process 1220 provides an initial evaluation of the ET source data and determines whether the current day is defined as a start day for global and class defined stations. Following the initial evaluation, some embodiments further identify those stations that are to be activated and determine effect runtimes, typically based on the net global and/or class ET values. In some embodiments, the daily received ET values are inspected and the minimum ET requirements are tested for success or failure (e.g., steps 1230 and 1236) at the time of receipt and/or download.

Figure 13:
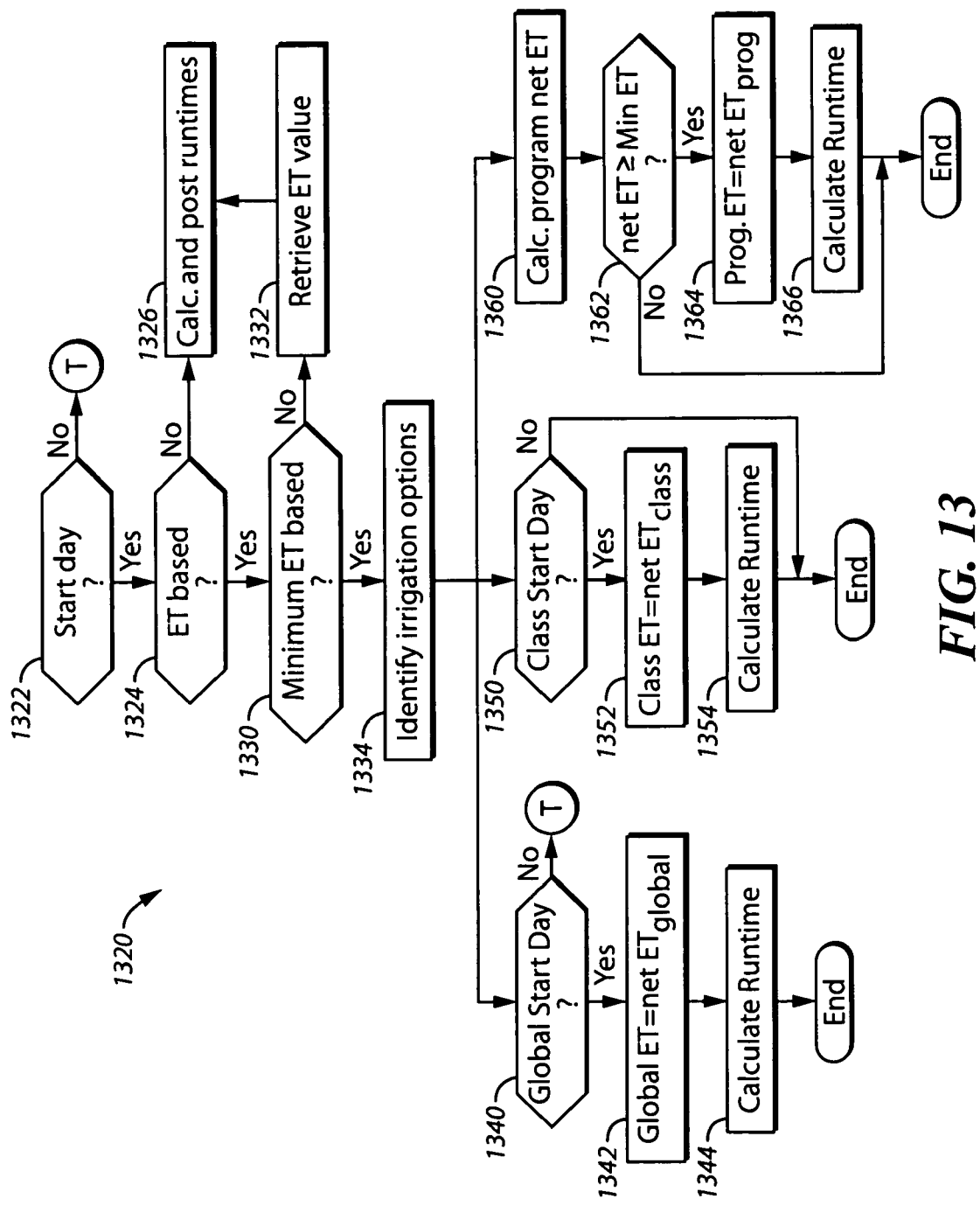
FIG. 13 depicts a simplified flow diagram of a process for determining runtimes for stations according to their defined irrigation options.

FIG. 13 depicts a simplified flow diagram of a process 1320 for determining runtimes for stations of a program according to their defined irrigation levels (e.g., global, class, and/or program specific). In step 1322, the process determines whether the current day is an allowable irrigation day for the program. In some instances, a user may not want to water on certain days or may not want to water from certain stations on some days. For example, a user may not want to water the greens on Mondays, Wednesdays and Fridays because these are the days the greens are mowed. Therefore, the user can de-select those start days, thus not allowing watering of the greens on Mondays, Wednesday and Fridays. Therefore, step 1322 determines whether a current day is an allowable start day in this irrigation program. For those programs defined not to allow watering for the current day, the process 1320 terminates.

When the program is allowed to water on the current day, the process continues to step 1324 where it is determined whether the program is controlled based on ET values. For those programs that are not controlled based on ET values, step 1326 is entered and the process retrieves the watering schedule for those stations associated with the programs and calculates and posts the runtimes based on the defined schedule. In step 1330, it is determined whether the program is activated according to a minimum ET value. For those programs that are not controlled based on a minimum ET, the process retrieves the current day's ET value in step 1332, and continues to step 1326 where the runtimes are calculated and posted based on the current day's ET.

When programs are controlled based on a minimum ET, step 1334 is entered where the process 1320 determines whether the program is designated to track a global control level, class control level, or program specific control level minimum ET. For those programs that are defined as global, the process enters step 1340 where the process determines whether irrigation should be initiated for the globally defined programs. In some implementations this determination is made by determining whether the current day can be set as a start day as described above with reference to step 1232 of process 1220 (see FIG. 12). Again, the current day is defined as a start day when the global net ET stack value (whether based on sum or average) equals or exceeds the global minimum ET. When the current day is not a start day, the process for the global programs terminates. Alternatively, when the current day is a start day, step 1342 is entered where a global irrigation ET value is set equal to the sum or average net global ET stack (e.g., as calculated in step 1226). In step 1344, runtimes are calculated based on the global irrigation ET value and posted to be utilized when irrigation is activated.

When the programs are defined to track a specific class minimum ET step 1350 is entered where the process 1320 determines whether irrigation should be initiated. Again, in some implementations this determination is made when determining whether the current day is set as a class start day for an identified class as described above with reference to step 1240. The current day is defined as a class start day when the net class ET stack value (whether based on sum or average) equals or exceeds the class minimum ET. When the current day is not a class start day, the process for those programs terminates. Alternatively, when the current day is a class start day (e.g., as defined in step 1240), step 1352 is entered where a class irrigation ET value is set equal to the sum or average net class ET (e.g., as calculated in step 1236 of FIG. 12). In step 1354, runtimes are calculated based on the class irrigation ET value and posted to be utilized when irrigation is activated.

The process 1320 further enters step 1360 when the programs are defined to track a program specific control level minimum ET. In step 1360, a net program specific ET value is calculated based on a sum or average of ET values since the last program specific start day. In step 1362, the net program specific ET value is compared with a program specific minimum ET value, such as the program specific minimum ET value as defined in step 642 of the process 620 (see FIG. 6). When the net program specific ET is less than the program specific minimum ET, the process terminates. Alternatively, when the net program specific ET is equal to or exceeds the program specific minimum ET, step 1364 is entered where the current day is set as a start day for the irrigation program of interest. In step 1366, runtimes for the program specific stations are determined based on the net program specific ET and are posted for irrigation when irrigation is initiated for the stations according to the irrigation schedule.

When a program is declared to be ET sensitive, irrigation is applied to replace the water consumed by the plant growth through the evapotranspiration process. In some embodiments, the irrigation runtimes for stations are calculated based on a sum or average ET since a last irrigation start day and stations' or sprinklers' specific precipitation rates. If precipitation rates are not available, some embodiments utilize a combination of default runtimes and corresponding reference ETs. For example, a user can specify a reference ET, along with default runtimes for each class. When the system receives ET data and does not have specified precipitation rates, a runtime ratio can be performed, such as the received ET divided by the reference ET times the default runtime. As such, the exact precipitation rate is not necessary and adjusted runtimes can still be generated based on current ET data.

The irrigation control levels provided through some embodiments enhance irrigation control, while simplifying and speeding the scheduling of irrigation. The program specific options utilize specified minimum ETs. A program defined as program specific can still be started manually or based on other sensor data (e.g., local sensors that measure soil moisture and/or other sensors). By overriding the minimum ET based operation of the program specific level, the last irrigation start day can be shifted to the day the override is activated. Alternatively, the override can simply be ignored and considered additional irrigation. Similarly with the global and class levels, overrides can be activated. The overrides of these levels typically are considered additional irrigation, however, some embodiments adjust the last start day to the override day.

The global and/or class control levels enforce the participation of the stations participating in a program defined within a class or otherwise defined as global when not defined according to program specific or class control levels. In some embodiments, those stations and/or programs defined as global or class specific are not allowed to have irregular or skipped days, because the defined skipped days could lead to unpredictable behavior. This is because a program with skipped days does not water on those days, even when a sum or averaged ET value may reach or exceed the minimum ET on that day resulting in a missed irrigation. For example, if a program is defined as global and is further defined requiring Wednesday, Fridays and Sundays to be skipped, potential weeks could go by without watering (e.g., on a Wednesday the sum ET is greater than the minimum ET and is set as a start day and resets the net ET, however, Wednesday is a skip day; Thursday's ET value does not exceed the minimum ET, but the sum of Thursday's and Friday's ET values do exceed the minimum ET, but again Friday is a skip day; etc.). Because manual and/or sensor starts or overrides are typically treated as additional watering for global and class levels and not taken into account in determining whether the sum or average ET exceeds the minimum ET, the programs defined as global and class remain synchronous with the other global programs or programs of the defined class. As such, the last start day since irrigation continues to reflect that of the global or class being tracked.

By utilizing the minimum ET and summing or averaging daily ET values, some embodiments conserver water while providing accurate watering that promotes deep root growth and healthy plants. Further, the multiple irrigation control levels provided by some embodiments allow users to define levels of irrigation and thus increase watering precision. The irrigation levels further aid in conserving water by focusing the runtimes to specific needs, and limits or avoids watering to a longest runtime denominator. Still further, the levels allow an irrigation control to be quickly and easily populated, as well as allowing easy adjustments.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for use in controlling an irrigation system executing a plurality of watering programs, the method comprising:
   receiving a first current moisture loss value;
   determining a first net moisture loss value since a last irrigation start day utilizing the first current moisture loss value;
   retrieving a threshold moisture loss value associated with one or more watering programs controlled according to a first irrigation control level of a plurality of selectable irrigation control levels where each level corresponds to a different way of associating threshold moisture loss values to watering programs;
   defining a current day as an irrigation start day for the one or more watering programs associated with the first irrigation control level of the plurality of selectable irrigation control levels when the first net moisture loss value has a predetermined relationship with respect to the threshold moisture loss value;
   identifying a first plurality of watering programs associated with an irrigation class of the first irrigation control level that is a class irrigation control level;
   the defining the current day as the irrigation start day comprises authorizing the activation of the first plurality of watering programs associated with the class when it is determined that a class irrigation control option is to be activated based on the first net moisture loss value;
   identifying a global irrigation control level;
   determining a global last irrigation start day associated with the global irrigation control level;
   the receiving the first current moisture loss value comprises receiving one or more current moisture loss values including the first current moisture loss value from one or more moisture loss sources;
   identifying at least one of the one or more moisture loss sources to be used in determining a global net moisture loss value;
   determining the global net moisture loss value based on moisture loss values received from the identified at least one of the one or more moisture loss sources received since the global last irrigation start day;
   determining whether the global irrigation control level is to be activated based on the global net moisture loss value; and
   authorizing activation of a second plurality of watering programs associated with the global irrigation control level when it is determined that the global irrigation control level is to be activated based on the global net moisture loss value;
   wherein the second plurality of irrigation programs comprise all watering programs controlled based on threshold moisture loss values and not associated with the class irrigation control level or a program specific irrigation control level; and controlling the irrigation system.

2. The method of claim 1, wherein the first current moisture loss value is based on a current evapotranspiration (ET) value, the first net moisture value is a first net ET value, and the threshold moisture loss value is a threshold ET value.

3. The method of claim 1, wherein the determining the first net moisture loss value comprises retrieving one or more previous days net moisture loss values since the last irrigation start day, summing the one or more previous days net moisture loss values since the last irrigation start day and setting the first net moisture loss value to the sum.

4. The method of claim 1, further comprising:
   identifying one or more watering programs associated with the first irrigation control level; and
   authorizing activation of the one or more irrigation programs associated with the first irrigation control level when the first net moisture loss value has the predetermined relationship with respect to the threshold moisture loss value.

5. The method of claim 1, further comprising: identifying a first watering program associated with a program specific irrigation control of a program specific irrigation control level;

determining a program specific last irrigation start day associated with the program specific irrigation control level;

the receiving the first current moisture loss value comprises receiving one or more current moisture loss values including the first current moisture loss value;

identifying at least one of the one or more current moisture loss values associated with a program specific net moisture loss value;

determining the program specific net moisture loss value based on the at least one of the one or more current moisture loss values associated with the program specific net moisture loss value received since the program specific last irrigation start day;

determining whether the program specific irrigation control level is to be activated based on the program specific net moisture loss value; and authorizing activation of a first watering program exclusively associated with the program specific irrigation control level when it is determined that the program specific irrigation control level is to be activated based on the program specific net moisture loss value.

6. A computer readable medium encoded with one or more code segments for use by a processor causing the processor to perform steps comprising:

receiving a first current moisture loss value;

determining a first net moisture loss value since a last irrigation start day utilizing the first current moisture loss value;

retrieving a threshold moisture loss value associated with one or more watering programs controlled according to a first irrigation control level of a plurality of selectable irrigation control levels where each level corresponds to a different way of associating threshold moisture loss values to watering programs;

defining a current day as an irrigation start day for the one or more watering programs associated with the first irrigation control level of the plurality of selectable irrigation control levels when the first net moisture loss value has a predetermined relationship with respect to the threshold moisture loss value;

identifying a first plurality of watering programs associated with an irrigation class of the first irrigation control level that is a class irrigation control level;

the defining the current day as the irrigation start day comprises authorizing the activation of the first plurality of watering programs associated with the class when it is determined that a class irrigation control option is to be activated based on the first net moisture loss value;

identifying a global irrigation control level;

determining a global last irrigation start day associated with the global irrigation control level;

the receiving the first current moisture loss value comprises receiving one or more current moisture loss values including the first current moisture loss value from one or more moisture loss sources;

identifying at least one of the one or more moisture loss sources to be used in determining a global net moisture loss value;

determining the global net moisture loss value based on moisture loss values received from the identified at least one of the one or more moisture loss sources received since the global last irrigation start day;

determining whether the global irrigation control level is to be activated based on the global net moisture loss value; and authorizing activation of a second plurality of watering programs associated with the global irrigation control level when it is determined that the global irrigation control level is to be activated based on the global net moisture loss value;

wherein the second plurality of irrigation programs comprise all watering programs controlled based on threshold moisture loss values and not associated with the class irrigation control level or a program specific irrigation control level.

7. A method for use in implementing irrigation, comprising:

identifying one or more field stations of a plurality of field stations;

associating an irrigation program with the one or more identified field stations;

determining that the irrigation program is to be activated based on a threshold moisture loss value;

associating the irrigation program with a first irrigation control level of a plurality of selectable irrigation control levels when the irrigation program is to be activated based on a threshold moisture loss value, where the plurality of irrigation control levels correspond to different ways of associating threshold moisture loss values to irrigation programs; and identifying a threshold moisture loss value associated with the first irrigation control level when the irrigation program is to be activated based on a threshold moisture loss value;

wherein the associating the irrigation program with the first irrigation control level of the plurality of selectable irrigation control levels comprises detecting that the irrigation program is not associated with a program specific control level and is not associated with a class of a class control level and associating the irrigation program with a global control level dictates control for a plurality of other irrigation programs; and the identifying the threshold moisture loss value comprises identifying a global threshold moisture loss value defined for the global control level such that each of the irrigation program and a plurality of other irrigation programs associated with the global control level are associated with the global threshold moisture loss value in response to being associated with the global control level without designating individual threshold moisture loss values for each of the irrigation program and the plurality of other irrigation programs associated with the global control level; and controlling irrigation.

8. The method of claim 7, wherein the associating the irrigation program with one of the plurality of the irrigation levels comprises associating the irrigation program with a global irrigation control level such that the irrigation program is associated with a plurality of irrigation programs of the global irrigation level where the irrigation program and the plurality of irrigation programs are not associated with another of the plurality of irrigation control levels.

9. The method of claim 7, wherein the determining that the irrigation program is to be activated based on the threshold moisture loss value and the identifying the threshold moisture loss value for the irrigation program when the irrigation program is to be activated based on a threshold moisture loss value comprise generating a first user interface comprising a threshold moisture loss value option selectable to cause the use of the threshold moisture loss value with the irrigation program.

10. The method of claim 9, wherein the generating the first user interface further comprises generating a selection of the plurality of irrigation control levels such that the irrigation program is associated with a selected one of the plurality of irrigation control levels.

11. The method of claim 10, wherein the associating the irrigation program with the first irrigation control level comprises generating a selection of classes defined in a class irrigation control level such that the irrigation program is associated with one or more additional irrigation programs associated with a selected class of the selection of classes.

12. The method of claim 9, wherein the generating the first user interface further comprises generating a threshold moisture loss value entry field through which the threshold moisture loss value is received that is applicable to the irrigation program such that the identifying the threshold moisture loss value for the irrigation program when the irrigation program is to be activated based on the threshold moisture loss value comprises receiving the threshold moisture loss value entered in the threshold moisture loss value entry field.

13. The method of claim 9, wherein the identifying the threshold moisture loss value for the irrigation program when the irrigation program is to be activated based on the threshold moisture loss value comprises generating a second user interface comprising a threshold moisture loss value entry field through which the threshold moisture loss value is received that is applicable to the irrigation program.

14. The method of claim 7, further comprising:
identifying that a net moisture loss value is determined by averaging received moisture loss values since a last start date where the net moisture loss value is associated with the irrigation program to be compared with the threshold moisture loss value to determine whether the irrigation program is to be activated.

15. The method of claim 7, further comprising:
identifying that a net moisture loss value is determined by summing received moisture loss values since a last start date where the net moisture loss value is associated with the irrigation program to be compared with the threshold moisture loss value to determine whether the irrigation program is to be activated.

16. The method of claim 7, wherein the associating the irrigation program with the first irrigation control level comprises determining whether the irrigation program is scheduled not to water on one or more days and associating the irrigation program with a program specific control level when the irrigation program is not to water on one or more days.

17. A computer readable medium encoded with one or more code segments for use by a processor causing the processor to perform steps comprising:
identifying one or more field stations of a plurality of field stations;
associating an irrigation program with the one or more identified field stations;
determining that the irrigation program is to be activated based on a threshold moisture loss value;
associating the irrigation program with a first irrigation control level of a plurality of selectable irrigation control levels when the irrigation program is to be activated based on a threshold moisture loss value, where the plurality of irrigation control levels correspond to different ways of associating threshold moisture loss values to irrigation programs; and identifying a threshold moisture loss value associated with the first irrigation control level when the irrigation program is to be activated based on a threshold moisture loss value;
wherein the associating the irrigation program with the first irrigation control level of the plurality of selectable irrigation control levels comprises detecting that the irrigation program is not associated with a program specific control level and is not associated with a class of a class control level and associating the irrigation program with a global control level dictates control for a plurality of other irrigation programs; and
the identifying the threshold moisture loss value comprises identifying a global threshold moisture loss value defined for the global control level such that each of the irrigation program and a plurality of other irrigation programs associated with the global control level are associated with the global threshold moisture loss value in response to being associated with the global control level without designating individual threshold moisture loss values for each of the irrigation program and the plurality of other irrigation programs associated with the global control level.

18. A method for use in implementing irrigation, comprising:
identifying one or more field stations of a plurality of field stations;
associating an irrigation program with the one or more identified field stations;
determining that the irrigation program is to be activated based on a threshold moisture loss value;
associating the irrigation program with a first irrigation control level of a plurality of selectable irrigation control levels when the irrigation program is to be activated based on a threshold moisture loss value, where the plurality of irrigation control levels correspond to different ways of associating threshold moisture loss values to irrigation programs;
identifying a threshold moisture loss value associated with the first irrigation control level when the irrigation program is to be activated based on a threshold moisture loss value;
wherein the associating the irrigation program with the first irrigation control level of the plurality of selectable irrigation control levels comprises associating the irrigation program with a class of a class irrigation control level such that the irrigation program is associated with a plurality of irrigation programs of the class; and
designating a class threshold moisture loss value for the class such that each of the plurality of irrigation programs associated with the class are associated with the class threshold moisture loss value in response to being associated with the class and without designating individual threshold values for each of the plurality of irrigation programs associated with the class; and controlling irrigation.

19. The method of claim 18, wherein the identifying the threshold moisture loss value for the irrigation program comprises identifying the threshold moisture loss value for the class to be applied to the irrigation program and each of the plurality of irrigation programs associated with the class of the irrigation class control level.

* * * * *

UNITED STATES PATENT AND TRADEMARK OFFICE
CERTIFICATE OF CORRECTION

| | | |
|---|---|---|
| PATENT NO. | : 7,532,954 B2 | Page 1 of 1 |
| APPLICATION NO. | : 11/352080 | |
| DATED | : May 12, 2009 | |
| INVENTOR(S) | : Rene H. Evelyn-Veere | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

Seventh Day of September, 2010

David J. Kappos
*Director of the United States Patent and Trademark Office*